(12) United States Patent
Studer et al.

(10) Patent No.: US 11,787,194 B2
(45) Date of Patent: Oct. 17, 2023

(54) SEALED INTERCONNECTS

(71) Applicant: Hewlett-Packard Development Company, L.P., Spring, TX (US)

(72) Inventors: Anthony Donald Studer, Albany, OR (US); David Olsen, Corvallis, OR (US); Quinton Buford Weaver, Albany, OR (US); Brian Allen Nichols, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 282 days.

(21) Appl. No.: 17/294,969

(22) PCT Filed: Jul. 18, 2019

(86) PCT No.: PCT/US2019/042466
§ 371 (c)(1),
(2) Date: May 18, 2021

(87) PCT Pub. No.: WO2020/117323
PCT Pub. Date: Jun. 11, 2020

(65) Prior Publication Data
US 2022/0009238 A1  Jan. 13, 2022

(30) Foreign Application Priority Data

Dec. 3, 2018  (WO) ................ PCT/US2018/063624
Dec. 3, 2018  (WO) ................ PCT/US2018/063630
(Continued)

(51) Int. Cl.
*B41J 2/175*  (2006.01)
*B41J 29/393*  (2006.01)
(Continued)

(52) U.S. Cl.
CPC ........... *B41J 2/17546* (2013.01); *B33Y 50/00* (2014.12); *B41J 2/1752* (2013.01); *B41J 2/1753* (2013.01);
(Continued)

(58) Field of Classification Search
CPC .. B41J 2/17546; B41J 2/17513; B41J 2/1752; B41J 2/17523; B41J 2/17526;
(Continued)

(56) References Cited

U.S. PATENT DOCUMENTS 3,109,125 A   10/1963  Wachowiak
3,553,483 A    1/1971  Jarvis
(Continued)

FOREIGN PATENT DOCUMENTS

AU      2014202104 A1    5/2014
CA         2507422 A1    1/2002
(Continued)

OTHER PUBLICATIONS

Arnostech, "Thermal Inkjet Printers," retrieved from http://www.arnostech.com/machines/coding-systems/thermal-inkjet-printers/, last retrieved on Jul. 1, 2019, 3 pages.
(Continued)

*Primary Examiner* — Matthew Luu
*Assistant Examiner* — Alexander D Shenderov
(74) *Attorney, Agent, or Firm* — Foley & Lardner LLP

(57) ABSTRACT

Examples of a print liquid supply unit are described herein. In some examples, the print liquid supply unit includes an electrical interconnect. In some examples, the electrical interconnect is sealed in a supply joint from an outside of the supply unit to an inside of the supply unit. In some examples, the supply joint is welded to join housing components of the supply unit.

25 Claims, 10 Drawing Sheets

(30) Foreign Application Priority Data

| Dec. 3, 2018 | (WO) | PCT/US2018/063631 |
|---|---|---|
| Dec. 3, 2018 | (WO) | PCT/US2018/063638 |
| Dec. 3, 2018 | (WO) | PCT/US2018/063643 |
| Apr. 5, 2019 | (WO) | PCT/US2019/026145 |

(51) Int. Cl.

| G01L 23/08 | (2006.01) |
|---|---|
| G06F 13/42 | (2006.01) |
| G06F 21/44 | (2013.01) |
| G06K 15/00 | (2006.01) |
| B33Y 50/00 | (2015.01) |
| G03G 15/08 | (2006.01) |
| G06K 15/10 | (2006.01) |
| G06F 9/30 | (2018.01) |
| G06F 21/62 | (2013.01) |
| H04L 9/08 | (2006.01) |
| H04L 9/32 | (2006.01) |

(52) U.S. Cl.
CPC ....... *B41J 2/17513* (2013.01); *B41J 2/17523* (2013.01); *B41J 2/17526* (2013.01); *B41J 2/17553* (2013.01); *B41J 2/17556* (2013.01); *B41J 2/17559* (2013.01); *B41J 2/17566* (2013.01); *B41J 29/393* (2013.01); *G01L 23/08* (2013.01); *G03G 15/0856* (2013.01); *G03G 15/0863* (2013.01); *G06F 9/30105* (2013.01); *G06F 13/42* (2013.01); *G06F 13/4282* (2013.01); *G06F 21/44* (2013.01); *G06F 21/62* (2013.01); *G06K 15/102* (2013.01); *G06K 15/4075* (2013.01); *H04L 9/0819* (2013.01); *H04L 9/3242* (2013.01); *B41J 2002/17516* (2013.01); *B41J 2002/17579* (2013.01); *B41J 2002/17586* (2013.01); *B41J 2202/13* (2013.01); *B41J 2202/20* (2013.01); *G05B 2219/49023* (2013.01); *G06F 2213/0016* (2013.01); *G06F 2213/40* (2013.01)

(58) Field of Classification Search
CPC .. B41J 2/1753; B41J 2/17553; B41J 2/17556; B41J 2/17559; B41J 2/17566; B41J 29/393; B41J 2002/17516; B41J 2002/17579; B41J 2002/17586; B41J 2202/13; B41J 2202/20; B41J 2002/17569; B41J 2/195; B33Y 50/00; G01L 23/08; G01L 5/1627; G03G 15/0856; G03G 15/0863; G06F 9/30105; G06F 13/42; G06F 13/4282; G06F 21/44; G06F 21/62; G06F 2213/0016; G06F 2213/40; G06F 21/60; G06F 21/608; G06K 15/102; G06K 15/4075; H04L 9/0819; H04L 9/3242; H04L 9/0891; H04L 9/12; H04L 9/3271; H04L 9/3297; G05B 2219/49023; G01F 23/247; G01F 23/804; G01F 25/20
USPC .......................................................... 347/85
See application file for complete search history.

(56) References Cited

U.S. PATENT DOCUMENTS

| 3,614,576 | A | 10/1971 | Raphael |
|---|---|---|---|
| 4,074,284 | A | 2/1978 | Dexter et al. |
| 4,503,441 | A | 3/1985 | Tamukai |
| 4,506,276 | A | 3/1985 | Kyser et al. |
| 4,639,738 | A | 1/1987 | Young et al. |
| 4,734,787 | A | 3/1988 | Hayashi |
| 5,001,596 | A | 3/1991 | Hart |
| 5,045,811 | A | 9/1991 | Lewis |
| 5,079,570 | A | 1/1992 | Mohr et al. |
| 5,142,909 | A | 9/1992 | Baughman |
| 5,329,254 | A | 7/1994 | Takano |
| 5,438,351 | A | 8/1995 | Trenchard et al. |
| 5,471,176 | A | 11/1995 | James et al. |
| 5,583,544 | A | 12/1996 | Stamer et al. |
| 5,680,960 | A | 10/1997 | Keyes et al. |
| 5,682,184 | A | 10/1997 | Stephany et al. |
| 5,699,091 | A | 12/1997 | Bullock |
| 5,731,824 | A | 3/1998 | Kneezel et al. |
| 5,751,323 | A | 5/1998 | Swanson |
| 5,757,406 | A | 5/1998 | Kaplinsky |
| 5,777,646 | A | 7/1998 | Barinaga |
| 5,777,943 | A | 7/1998 | Kim et al. |
| 5,788,388 | A | 8/1998 | Cowger et al. |
| 5,861,780 | A | 1/1999 | Fukuda |
| 5,975,688 | A | 11/1999 | Kanaya et al. |
| 6,068,363 | A | 5/2000 | Saito |
| 6,098,457 | A | 8/2000 | Poole |
| 6,151,039 | A | 11/2000 | Hmelar et al. |
| 6,164,766 | A | 12/2000 | Erickson |
| 6,175,929 | B1 | 1/2001 | Hsu et al. |
| 6,219,933 | B1 | 4/2001 | Taniguchi |
| 6,299,273 | B1 | 10/2001 | Anderson |
| 6,312,074 | B1 | 11/2001 | Walker |
| 6,341,853 | B1 | 1/2002 | Scheffelin et al. |
| 6,386,693 | B1 | 5/2002 | Michele |
| 6,402,299 | B1 | 6/2002 | DeMeerleer |
| 6,412,901 | B2 | 7/2002 | Su et al. |
| 6,431,670 | B1 | 8/2002 | Schantz et al. |
| 6,456,802 | B1 | 9/2002 | Phillips |
| 6,457,355 | B1 | 10/2002 | Philipp |
| 6,494,553 | B1 | 12/2002 | Donahue et al. |
| 6,494,568 | B2 | 12/2002 | Hou et al. |
| 6,598,963 | B1 | 7/2003 | Yamamoto et al. |
| 6,641,240 | B2 | 11/2003 | Hsu et al. |
| 6,641,243 | B2 | 11/2003 | Anderson et al. |
| 6,648,434 | B2 | 11/2003 | Walker et al. |
| 6,685,290 | B1 | 2/2004 | Farr et al. |
| 6,736,497 | B2 | 5/2004 | Jung |
| 6,796,644 | B1 | 9/2004 | Anderson, Jr. et al. |
| 6,802,581 | B2 | 10/2004 | Hasseler et al. |
| 6,802,602 | B2 | 10/2004 | Sakai et al. |
| 6,811,250 | B2 | 11/2004 | Buchanan et al. |
| 6,902,256 | B2 | 6/2005 | Anderson et al. |
| 6,908,179 | B2 | 6/2005 | Pan et al. |
| 6,959,599 | B2 | 11/2005 | Feldstein et al. |
| 6,966,222 | B2 | 11/2005 | Carson et al. |
| 6,969,137 | B2 | 11/2005 | Maeda |
| 7,039,734 | B2 | 5/2006 | Sun et al. |
| 7,077,506 | B2 | 7/2006 | Chen |
| 7,155,972 | B2 | 1/2007 | Kosugi |
| 7,171,323 | B2 | 1/2007 | Shipton et al. |
| 7,240,130 | B2 | 7/2007 | Larson |
| 7,260,662 | B2 | 8/2007 | Moriwaki et al. |
| 7,328,115 | B2 | 2/2008 | Shipton et al. |
| 7,380,042 | B2 | 5/2008 | Wang et al. |
| 7,458,656 | B2 | 12/2008 | Smith |
| 7,533,960 | B2 | 5/2009 | Yasuda et al. |
| 7,547,082 | B2 | 6/2009 | Lee et al. |
| 7,630,304 | B2 | 12/2009 | Larson et al. |
| 7,686,423 | B2 | 3/2010 | Sato et al. |
| 7,740,347 | B2 | 6/2010 | Silverbrook et al. |
| 7,775,638 | B2 | 8/2010 | Hirosawa et al. |
| 7,841,712 | B2 | 11/2010 | Muyskens et al. |
| 7,886,197 | B2 | 2/2011 | Wegman |
| 7,890,690 | B2 | 2/2011 | Naderi et al. |
| 7,970,042 | B2 | 6/2011 | Lexmark |
| 8,040,215 | B2 | 10/2011 | Zakriti |
| 8,161,224 | B2 | 4/2012 | Laurencin et al. |
| 8,215,018 | B2 | 7/2012 | Morita et al. |
| 8,220,910 | B2 | 7/2012 | Wanibe |
| 8,224,602 | B2 | 7/2012 | Lory et al. |
| 8,289,788 | B2 | 10/2012 | Asauchi |
| 8,331,581 | B2 | 12/2012 | Pennock |
| 8,348,377 | B2 | 1/2013 | Asauchi |
| 8,350,628 | B1 | 1/2013 | George et al. |

(56) References Cited

U.S. PATENT DOCUMENTS

| | | |
|---|---|---|
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |
| 8,438,919 B2 | 5/2013 | Phillips et al. |
| 8,454,137 B2 | 6/2013 | Price et al. |
| 8,556,394 B2 | 10/2013 | Chen |
| 8,558,577 B1 | 10/2013 | Soriano Fosas et al. |
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,651,614 B2 | 2/2014 | Sakamoto |
| 8,651,643 B2 | 2/2014 | Harvey |
| 8,721,059 B2 | 5/2014 | Kodama et al. |
| 8,721,203 B2 | 5/2014 | Ehrhardt, Jr. |
| 8,752,943 B2 | 6/2014 | Hirano |
| 8,864,277 B2 | 10/2014 | Rice et al. |
| 8,876,257 B2 | 11/2014 | Harada et al. |
| 8,888,207 B2 | 11/2014 | Furness, III |
| 8,892,798 B2 | 11/2014 | Tailliet et al. |
| 8,898,358 B2 | 11/2014 | DeCesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson, III et al. |
| 9,137,093 B1 | 9/2015 | Abraham |
| 9,176,921 B2 | 11/2015 | Fister et al. |
| 9,194,734 B2 | 11/2015 | Mehrer |
| 9,213,396 B1 | 12/2015 | Booth et al. |
| 9,213,927 B1 | 12/2015 | Ahne et al. |
| 9,254,661 B2 | 2/2016 | Otaka et al. |
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,412,461 B2 | 9/2019 | Long et al. |
| 10,471,725 B2 | 11/2019 | Esterberg |
| 10,875,318 B1 | 12/2020 | Gardner |
| 10,894,423 B2 | 1/2021 | Gardner |
| 11,034,157 B2 | 6/2021 | Gardner |
| 2001/0029554 A1 | 10/2001 | Namba |
| 2001/0033316 A1 | 10/2001 | Eida |
| 2002/0012016 A1 | 1/2002 | Wilson |
| 2002/0012616 A1 | 1/2002 | Zhou et al. |
| 2002/0033855 A1 | 3/2002 | Kubota et al. |
| 2002/0108018 A1* | 8/2002 | Chen .................. G11C 7/20 711/115 |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler et al. |
| 2004/0036733 A1 | 2/2004 | Kubota et al. |
| 2004/0085382 A1 | 5/2004 | Kosugi et al. |
| 2004/0095444 A1 | 5/2004 | Drummond et al. |
| 2004/0155913 A1 | 8/2004 | Kosugi et al. |
| 2004/0252146 A1 | 12/2004 | Naka |
| 2005/0010910 A1 | 1/2005 | Lindhorst et al. |
| 2005/0093910 A1 | 5/2005 | Im |
| 2005/0125105 A1 | 6/2005 | Halstead |
| 2005/0126282 A1 | 6/2005 | Maatuk |
| 2005/0157056 A1 | 7/2005 | Silverbrook et al. |
| 2005/0185595 A1 | 8/2005 | Lee |
| 2005/0229699 A1 | 10/2005 | Chai et al. |
| 2006/0000810 A1 | 1/2006 | Kerr et al. |
| 2006/0007253 A1 | 1/2006 | Kosugi |
| 2006/0007295 A1 | 1/2006 | Ueda |
| 2006/0072952 A1 | 4/2006 | Plunkett et al. |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |

(56) References Cited

U.S. PATENT DOCUMENTS

| | | |
|---|---|---|
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan |
| 2012/0284429 A1 | 11/2012 | Adkins et al. |
| 2012/0299989 A1 | 11/2012 | Prothon |
| 2013/0018513 A1 | 1/2013 | Ecobee |
| 2013/0050359 A1* | 2/2013 | Kanbe ............ B41J 2/1753 347/86 |
| 2013/0054933 A1 | 2/2013 | Fister et al. |
| 2013/0067015 A1 | 3/2013 | Vasters |
| 2013/0067016 A1 | 3/2013 | Adkins et al. |
| 2013/0083499 A1* | 4/2013 | Kamiya ............ B41J 2/17553 29/829 |
| 2013/0155142 A1 | 6/2013 | Browning et al. |
| 2013/0155157 A1 | 6/2013 | Harvey et al. |
| 2013/0250024 A1 | 9/2013 | Kakishima |
| 2013/0295245 A1 | 11/2013 | Gardner |
| 2013/0307908 A1 | 11/2013 | Aoki et al. |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell |
| 2017/0100941 A1 | 4/2017 | Kuribayashi |
| 2017/0144448 A1 | 5/2017 | Smith |
| 2017/0157929 A1 | 6/2017 | Yokoo |
| 2017/0168976 A1 | 6/2017 | Yost et al. |
| 2017/0169623 A1 | 6/2017 | Chen |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumble et al. |
| 2018/0143935 A1 | 5/2018 | Cox et al. |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade |
| 2018/0290457 A1 | 10/2018 | Ge |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie |
| 2019/0240985 A1 | 8/2019 | Ge |
| 2020/0159689 A1 | 5/2020 | Koshisaka |
| 2021/0334392 A1 | 10/2021 | Panshin |

FOREIGN PATENT DOCUMENTS

| | | |
|---|---|---|
| CN | 1259091 A | 7/2000 |
| CN | 2603934 | 2/2004 |
| CN | 1532063 A | 9/2004 |
| CN | 2734479 | 10/2005 |
| CN | 1840346 A | 10/2006 |
| CN | 1840349 A | 10/2006 |
| CN | 201761148 | 3/2011 |
| CN | 102231054 | 11/2011 |
| CN | 103171293 A | 6/2013 |
| CN | 203651218 U | 6/2014 |
| CN | 102736627 | 12/2014 |
| CN | 103879149 B | 6/2015 |
| CN | 105760318 A | 7/2016 |
| CN | 107209743 A | 9/2017 |
| CN | 108463703 A | 8/2018 |
| CN | 108819486 | 11/2018 |
| CN | 209014461 U | 6/2019 |
| DE | 3712699 C2 | 3/1989 |
| EP | 0015954 A1 | 6/1984 |
| EP | 0644051 A1 | 3/1995 |
| EP | 0720916 A2 | 7/1996 |
| EP | 1285764 | 2/2003 |
| EP | 0994779 B1 | 4/2003 |
| EP | 1314565 A2 | 5/2003 |
| EP | 1238811 B1 | 12/2006 |
| EP | 1800872 | 6/2007 |
| EP | 1389531 | 7/2007 |
| EP | 1164022 B1 | 7/2008 |
| EP | 1524120 B1 | 9/2008 |
| EP | 2237163 A1 | 10/2010 |
| EP | 1839872 B1 | 11/2010 |
| EP | 2385468 | 11/2011 |
| EP | 2641742 A2 | 9/2013 |
| EP | 2854063 | 6/2019 |
| EP | 3208736 | 12/2019 |
| GB | 2519181 | 4/2015 |
| JP | H04220353 | 8/1992 |
| JP | 2001292133 | 10/2001 |
| JP | 2001-328279 A | 11/2001 |
| JP | 2002026471 A | 1/2002 |
| JP | 2003326726 | 11/2003 |
| JP | 2005262458 A | 9/2005 |
| JP | 2009258604 | 11/2009 |
| JP | 2010079199 | 4/2010 |
| JP | 2011113336 | 6/2011 |
| JP | 2012063770 | 3/2012 |
| JP | 2013197677 | 9/2013 |
| JP | 5644052 B2 | 12/2014 |
| JP | 2014534917 | 12/2014 |
| JP | 2015-066844 A | 4/2015 |
| JP | 2016185664 | 10/2016 |
| JP | 2017196842 | 11/2017 |
| JP | 2018049141 | 3/2018 |
| JP | 2018136774 | 8/2018 |
| JP | 2018161785 | 10/2018 |
| JP | 2018531394 | 10/2018 |
| KR | 20080003539 A | 1/2008 |
| KR | 101785051 | 10/2017 |
| TW | 200707209 A | 2/2007 |
| TW | 201202948 A | 1/2012 |
| TW | 201546620 A | 12/2015 |

(56) References Cited

FOREIGN PATENT DOCUMENTS

| | | |
|---|---|---|
| WO | WO-2007107957 A1 | 9/2007 |
| WO | WO-2017174363 | 10/2007 |
| WO | WO-2008117194 A1 | 10/2008 |
| WO | WO-2009145774 A1 | 12/2009 |
| WO | WO-2012020443 | 2/2012 |
| WO | WO-2012054050 | 4/2012 |
| WO | WO-2012054050 A1 | 4/2012 |
| WO | WO-2012057755 A1 | 5/2012 |
| WO | WO-2013048430 A1 | 4/2013 |
| WO | 2014/126547 A1 | 8/2014 |
| WO | WO-2015116092 A1 | 8/2015 |
| WO | WO-2016061480 | 4/2016 |
| WO | WO-2016114759 | 7/2016 |
| WO | WO-2016130157 | 8/2016 |
| WO | WO-2013048430 | 5/2017 |
| WO | WO-2017074334 A1 | 5/2017 |
| WO | WO-2017074342 | 5/2017 |
| WO | WO-2017074342 A1 | 5/2017 |
| WO | WO-2017184147 A1 | 10/2017 |
| WO | WO-2017189009 | 11/2017 |
| WO | WO-2017189009 A1 | 11/2017 |
| WO | WO-2017189010 A1 | 11/2017 |
| WO | WO-2017189011 | 11/2017 |
| WO | WO-2017189011 A1 | 11/2017 |
| WO | WO-2017189013 | 11/2017 |
| WO | WO-2018017066 | 1/2018 |
| WO | WO-2018017066 A1 | 1/2018 |
| WO | WO-2018022038 | 2/2018 |
| WO | 2018/063379 A1 | 4/2018 |
| WO | WO-2018186847 A1 | 10/2018 |
| WO | WO-2018199886 | 11/2018 |
| WO | WO-2018199891 | 11/2018 |
| WO | WO-2018199895 | 11/2018 |
| WO | WO-2018217185 A1 | 11/2018 |
| WO | WO-WO2018199891 A1 | 11/2018 |
| WO | WO-2019017963 | 1/2019 |
| WO | WO-2019078834 A1 | 4/2019 |
| WO | WO-2019078835 | 4/2019 |
| WO | WO-2019078839 | 4/2019 |
| WO | WO-2019078840 | 4/2019 |
| WO | WO-2019078843 | 4/2019 |
| WO | WO-2019078844 | 4/2019 |
| WO | WO-2019078845 | 4/2019 |

OTHER PUBLICATIONS

Epson, "Epson provides the best inks for the job," retrieved from https://www.epson.co.nz/microsite/excellence/inks_why.asp, ast retrieved on Jul. 1, 2019, 3 pages.
HP, "Development of the HP DeskJet 1200C Print Cartridge Platform", Feb. 1994, 9 pages.
International Searching Authority "International Search Report and Written Opinion" issued in connection with PCT/U S2019/026159 dated Aug. 15, 2019, 15 pages.
International Searching Authority "International Search Report and Written Opinion " issued in connection with PCT/US2018/063624 dated Aug. 23, 2019, 13 pages.
International Searching Authority "International Search Report and Written Opinion " issued in connection with PCT/US2018/063630 dated Aug. 22, 2019, 15 pages.
International Searching Authority "International Search Report and Written Opinion" issued in connection with PCT/US2018/063633 dated Jul. 23, 2019, 12 pages.
International Searching Authority "International Search Report and Written Opinion" issued in connection with PCT/US2018/063638 dated Aug. 26, 2019, 13 pages.
International Searching Authority "International Search Report and Written Opinion" issued in connection with PCT/US2018/063643 dated Aug. 20, 2019, 13 pages.
International Searching Authority "International Search Report and Written Opinion" issued in connection with PCT/US2019/017511 dated Dec. 3, 2018, 12 pages.
International Searching Authority "International Search Report and Written Opinion" issued in connection with PCT/US2019/026124 dated Aug. 26, 2019, 15 pages.
International Searching Authority "International Search Report and Written Opinion" issued in connection with PCT/US2019/026133 dated Aug. 26, 2019, 18 pages.
International Searching Authority "International Search Report and Written Opinion" issued in connection with PCT/US2019/026145 dated Sep. 5, 2019, 16 pages.
International Searching Authority "International Search Report and Written Opinion" issued in connection with PCT/US2019/026161 dated Aug. 23, 2019, 20 pages.
International Searching Authority "International Search Report and Written Opinion" issued in connection with PCT/US2018/063631 dated Aug. 23, 2019, 13 pages.
Maxim Integrated Products "1-to-8 I2C Bus Switches/Multiplexers with Bus Lock-Up Detection, Isolation, and Notification" dated Sep. 2008, 22 pages.
NXP "Introducing A10006 Secure Authenticator Tamper-Resistant Anti Counterfeit Solution", last retrieved on Jul. 3, 2019, 29 pages.
NXP Semiconductors N.V. "NXP 2-, 4-, and 8-channel I2C/SMBus muxes and switches PCA954x" released Apr. 1, 2014, 34 pages.
NXP Semiconductors N.V. "PCA9641: 2-channel I2C-bus master arbiter Product data Sheet" released Oct. 23, 2014, 77 pages.
Open Source Multi-head 3D printer for polymer metal composite component manufacturing.
PCA954x I2C-bus multiplexer, Jul. 2008, NXP Semiconductors.
PCA9641 I2C arbiter, Oct. 2014, NXP Semiconductors.
Reddit, "Use an accelerometer to measure Z wobble", last retrieved on Jul. 1, 2019, https://www.reddit.com/r/Reprap/comments/6qsoyd/use_an_accelerometer_to_measure_z_wobble/ 3 pages.
The I2C-Bus Specification Version 2.Jan. 1, 2000 (Year: 2000), 46 pages.
United States Patent and Trademark Office, "Non-Final office action," issued in connection with U.S. Appl. No. 16/502,479, dated Dec. 11, 2019, 13 pages.
United States Patent and Trademark Office, "Non-Final Office action," issued in connection with U.S. Appl. No. 16/460,016, dated Sep. 12, 2019, 12 pages.
United States Patent and Trademark Office, "Non-Final Office action," issued in connection with U.S. Appl. No. 16/505,090, dated Sep. 10, 2019, 20 pages.
United States Patent and Trademark Office, "Notice of Allowance ," issued in connection with U.S. Appl. No. 16/502,479, dated Apr. 9, 2020, 9 pages.
United States Patent and Trademark Office, "Notice of allowance," issued in connection with U.S. Appl. No. 16/460,016, dated Mar. 25, 2020, 10 pages.
United States Patent and Trademark Office, "Notice of Allowance," issued in connection with U.S. Appl. No. 16/505,090, dated Feb. 12, 2020, 9 pages.
United States Patent and Trademark Office, "Notice of Allowance," issued in connection with U.S. Appl. No. 16/505,090, dated Oct. 22, 2019, 5 pages.
United States Patent and Trademark Office, "Notice of Allowance," issued in connection with U.S. Appl. No. 16/728,207, dated Feb. 19, 2020 19 pages.
United States Patent and Trademark Office, "Restriction Requirement," issued in connection with U.S. Appl. No. 16/502,479, dated Aug. 15, 2019, 7 pages.

* cited by examiner

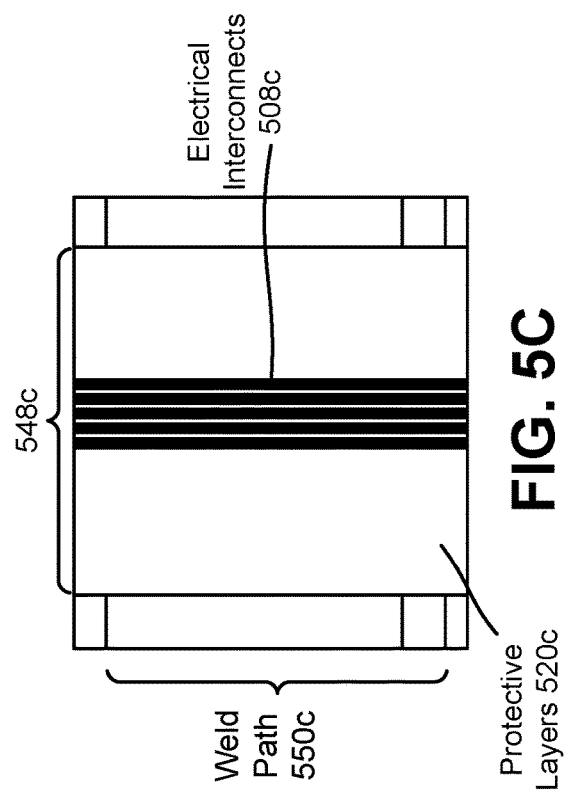
FIG. 5A
FIG. 5B
FIG. 5C
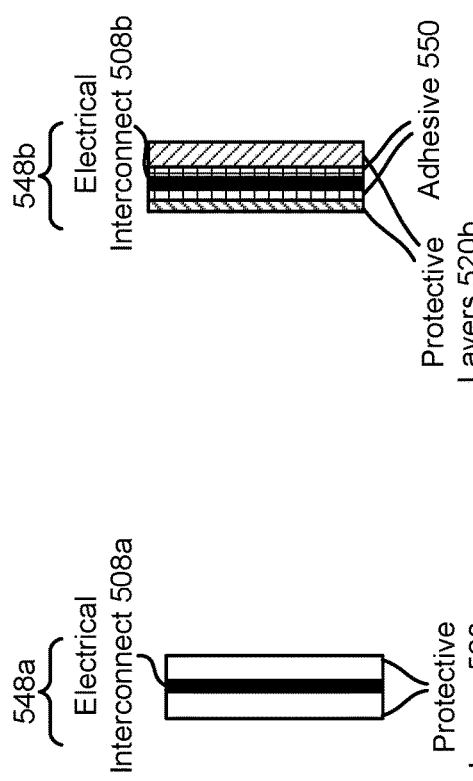
FIG. 5D
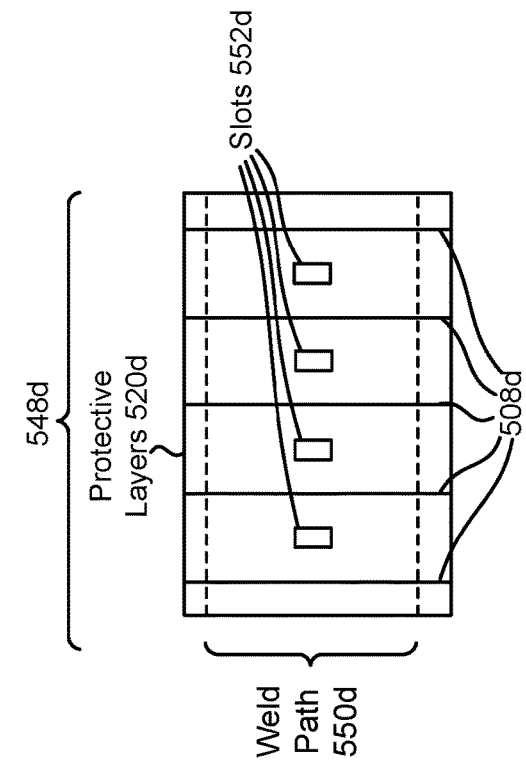
FIG. 5E

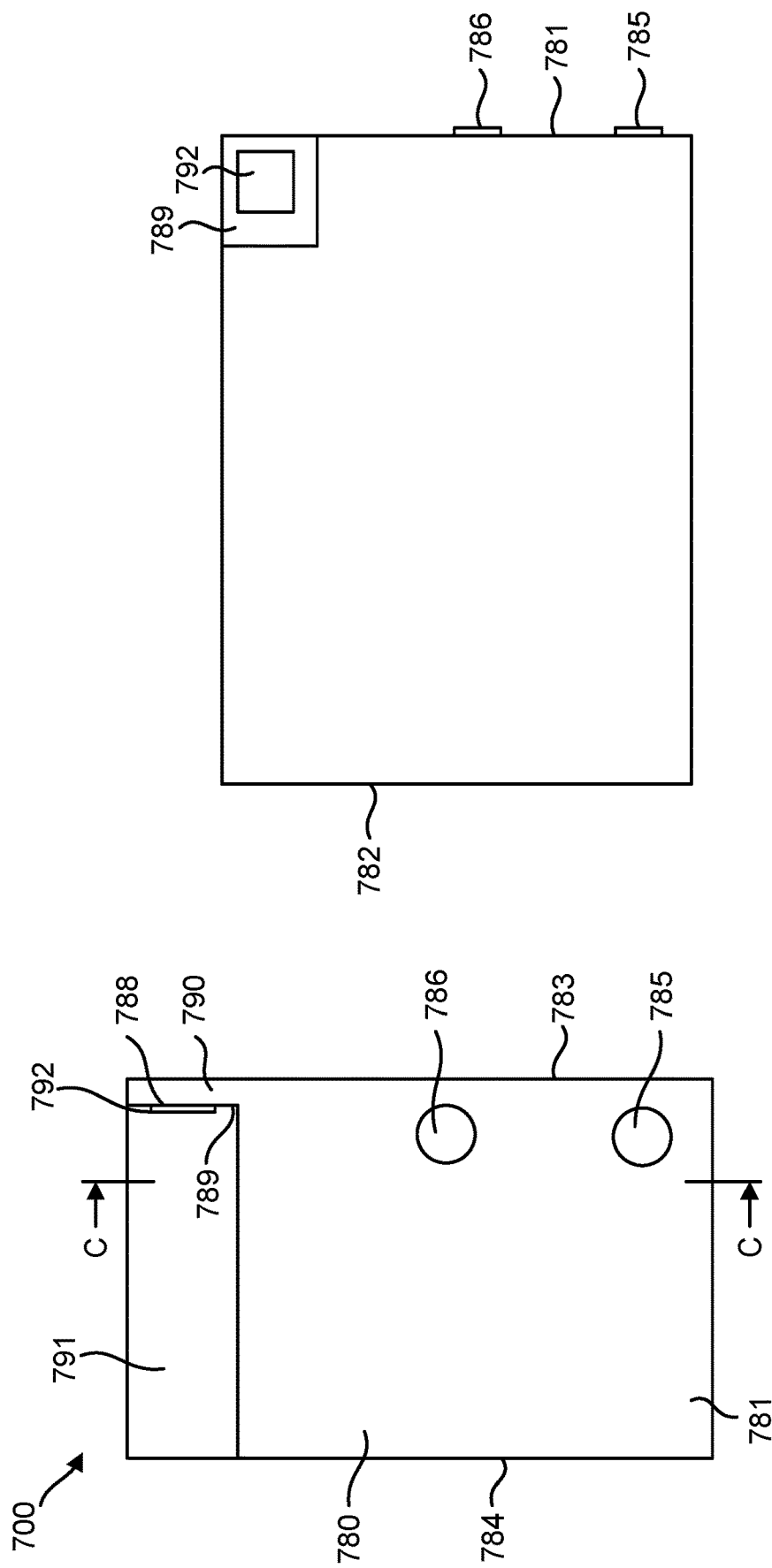

SEALED INTERCONNECTS

RELATED APPLICATIONS

This application is related to and claims priority to PCT International Application No. PCT/US2018/063643, filed Dec. 3, 2018, for "LOGIC CIRCUITRY," and to PCT International Application No. PCT/US2019/026145, filed Apr. 5, 2019, for "LOGIC CIRCUITRY," which claims priority to PCT International Application No. PCT/US2018/063631, filed Dec. 3, 2018, to International Application No. PCT/US2018/063624, filed Dec. 3, 2018, to International Application No. PCT/US2018/063630, filed Dec. 3, 2018, to International Application No. PCT/US2018/063638, filed Dec. 3, 2018, and to International Application No. PCT/US2018/063643, filed Dec. 3, 2018.

BACKGROUND

Some types of printing utilize liquid. For example, some types of printing extrude liquid onto media or material to produce a printed product (e.g., two-dimensional (2D) printed content, three-dimensional (3D) printed objects). In some examples, a print head may be utilized to extrude ink onto paper to print text and/or images. In some examples, a print head may be utilized to extrude fusing agent onto material in order to form a 3D printed object.

BRIEF DESCRIPTION OF THE DRAWINGS

FIG. 5A is a diagram illustrating a side view of an example of an electrical interconnect or electrical interconnects and protective layers;

FIG. 5B is a diagram illustrating a side view of an example of an electrical interconnect or electrical interconnects and protective layers;

FIG. 5C is a diagram illustrating a front view of an example of flexible electrical connection including electrical interconnects and protective layers;

FIG. 5D is a diagram illustrating an example of an electrical connector;

FIG. 5E is a diagram illustrating an example of an electrical connector;

FIG. 7 shows an example print liquid supply cartridge;

FIG. 8 is a cross-sectional view through the line C-C of the example print liquid supply cartridge of FIG. 7;

DETAILED DESCRIPTION

Figure 1:
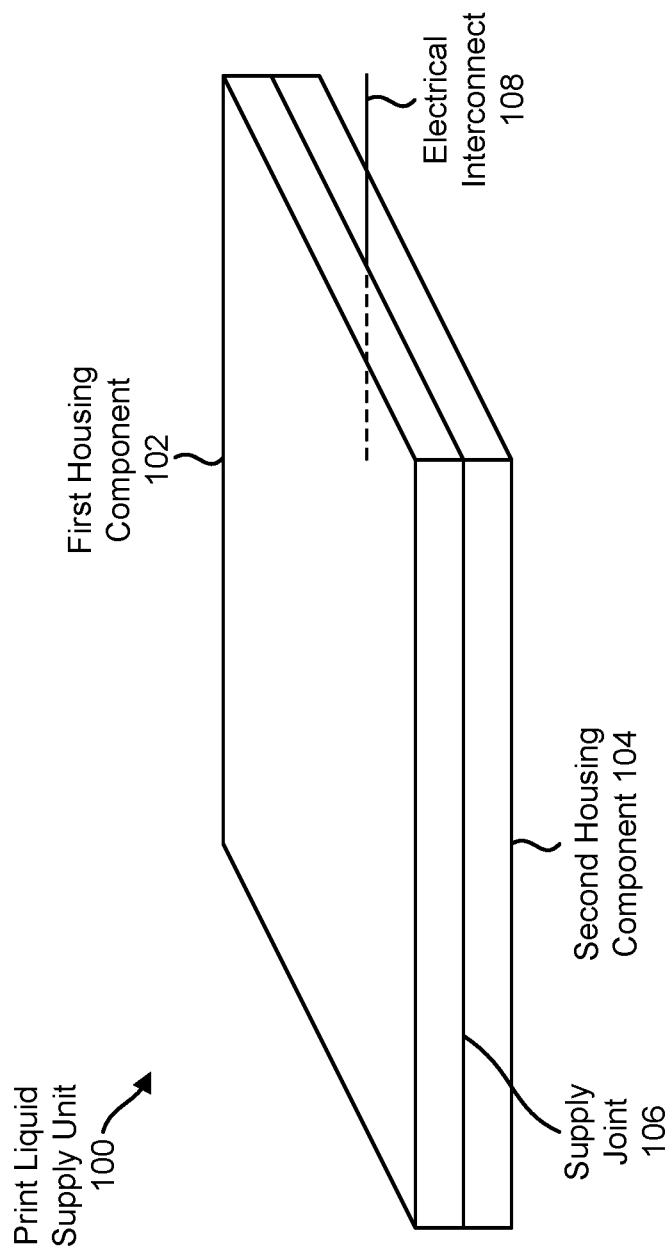
FIG. 1 is a diagram illustrating a perspective view of an example of a print liquid supply unit.

Some issues arise in the context of utilizing print liquid. Print liquid is a fluid for printing. Examples of print liquid include ink and fusing agent. In some examples, accurately sensing an amount of print liquid remaining in a reservoir may be difficult due to issues like liquid bridging, environmental conditions, and water vapor transmission rates. An inaccurately sensed liquid level may lead to changing the reservoir more often, wasting print liquid, and/or increasing printing expense. Accordingly, it may be beneficial to provide more delivered print liquid, a more reliable sensed print liquid level, and/or less ink supply changes.

A sensor or sensors may be utilized to increase print liquid level sensing accuracy. The sensor(s) may be housed in a print liquid supply unit. A print liquid supply unit is a container that holds print liquid. In some examples, a print liquid supply unit may be referred to as a print liquid container, a cartridge, a supply, print liquid supply cartridge, etc. The print liquid may be supplied to a printer. For example, four print liquid supplies may be utilized for a printer, which may include black, cyan, magenta, and yellow print liquid supplies. This may allow print liquid supplies with colors to be replaced individually. For example, a print liquid color that is used more often may be replaced individually without replacing remaining print liquid of another color or colors.

In some examples, print liquid supply units may be constructed of thermoplastics. Thermoplastics may be injection molded and may be compatible with high volume manufacturing and/or assembly methods. It may be beneficial for the construction materials (e.g., materials to construct components of the print liquid supply) to be compatible with the print liquid, to be robust to environmental conditions during shipping/handling, and/or to provide target water vapor transmission rates such that print quality is maintained over the life of the print liquid supply unit. In some examples, print liquid supply units may be constructed from thermoplastics such as polypropylene (PP), low-density polyethylene (LDPE), high-density polyethylene (HDPE), polyethylene terephthalate (PET), polycarbonate (PC), and/or blends thereof. Some thermoplastics may be compatible with high volume assembly methods such as ultrasonic welding, vibration welding, and/or laser welding. In some examples, welding (e.g., laser welding) may be capable of creating waterproof joint seals to contain the print liquid. As used herein, "welding," "weld," and variations thereof may denote laser welding, ultrasonic welding, and/or vibration welding. Other approaches for joining components may be excluded from the term "welding" (and variations thereof) in some examples.

Welding may be beneficial because plastic parts may be joined via high speed melting. For example, welding may not include utilizing another bonding agent or additional parts. Issues may arise when attempting to pass an electrical connection through a welded joint. For example, a sensor may be housed in a print liquid supply unit and may utilize a conductor that passes through a welded joint. Some examples of the techniques described herein may include providing an electrical connection through a joint that is welded.

In some examples, the electrical connection may be sealed through a joint of thermoplastic material without other materials. Some examples may not utilize double-sided pressure sensitive adhesive (PSA) gaskets, elastomeric gaskets, and/or various glue joints, which may increase a number of constraints such as compatibility with print liquid, ability to seal different joint materials and the electrical connection, robustness, and/or setting/curing time. Some examples may provide a flexible electrical connection that can be placed in the supply joint and sealed via local compression by laser welding the supply joint.

Throughout the drawings, identical reference numbers may designate similar, but not necessarily identical, elements. Similar numbers may indicate similar elements. When an element is referred to without a reference number, this may refer to the element generally, without necessary limitation to any particular Figure. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

FIG. 1 is a diagram illustrating a perspective view of an example of a print liquid supply unit 100. Examples of the print liquid supply unit 100 include print liquid containers, cartridges, supplies, print liquid supply cartridges, etc. The print liquid supply unit 100 may contain and/or transfer print liquid (e.g., ink, agent, etc.). In some examples, the print liquid supply unit 100 may be designed to interface with a host device. A host device is a device that uses and/or applies print liquid. Examples of a host device include printers, ink jet printers, 3D printers, etc. For example, it may be beneficial to replenish or replace the print liquid supply unit 100 when some or all of the print liquid has been utilized.

In the example illustrated in FIG. 1, the print liquid supply unit 100 includes a first housing component 102 and a second housing component 104. The first housing component 102 and the second housing component 104 are structures for containing print liquid. For example, the first housing component 102 may be joined to the second housing component 104 to form a volume to contain print liquid. In some examples, the first housing component 102 and the second housing component 104 may be made of a thermoplastic or a combination of thermoplastics. In some examples, the first housing component 102 may be a lid of the print liquid supply unit 100 and the second housing component may be body of the print liquid supply unit 100.

The first housing component 102 may be welded to the second housing component 104 along a supply joint 106. The supply joint 106 is an interface between the first housing component 102 and the second housing component 104. In some examples, the supply joint 106 is welded to join housing components of the print liquid supply unit 100. For instance, the first housing component 102 may be welded to the second housing component 104 along the supply joint 106 using laser welding, ultrasonic welding, and/or vibration welding. In some examples, welding may be applied along the entire supply joint 106. In other examples, welding may be applied along a portion (e.g., not the entire path) of the supply joint 106. The first housing component 102 may include first joint geometry and the second housing component 104 may include second joint geometry. Joint geometry is a form or shape of a surface along which the supply joint 106 may be formed.

Welding may cause a phase change in the material of the first housing component 102 and/or the second housing component 104. For example, the second housing component 104 may have an opening on one side of the second housing component to be closed with the first housing component to make a waterproof seal for the print liquid. In some examples, the first housing component 102 and the second housing component 104 may be made of polypropylene material and may be joined using laser welding.

In some examples, the first housing component 102 may be press-fit to the second housing component 104 via a post or posts that serve to align the first housing component 102 and keep it on the second housing component 104 as the print liquid supply unit 100 enters a welder. Pressure may be applied to the print liquid supply unit 100. For example, a clamp may be applied to the first housing component 102 while the second housing component 104 is supported. A laser beam may be passed through the first housing component 102 to the underlying joint geometry or geometries below. The second housing component 104 may absorb a portion (e.g., a majority) of the energy, which may cause the material of the second housing component 104 (along the supply joint 106, for example) to melt. The pressure and phase change of the material may cause the first housing component 102 to join to the second housing component. In some examples, because the print liquid supply unit 100 is under pressure, the print liquid supply unit 100 may collapse slightly, which may cause the material along the supply joint 106 to widen.

An electrical interconnect 108 may be situated through the supply joint 106. For example, the electrical interconnect 108 may be sealed in the supply joint 106 from an outside of the print liquid supply unit 100 to an inside of the print liquid supply unit 100. In some examples, the inside of the print liquid supply unit 100 may contain print liquid. In some examples, the electrical interconnect 108 may be coupled to a sensor for the interior of the print liquid supply unit 100. In some examples, the electrical interconnect 108 may be coupled to an electrical interface (e.g., electrical connection pad(s)) for the exterior of the print liquid supply unit 100. The electrical interface may be utilized to communicate with a printer in some examples.

The electrical interconnect 108 may be a material that is able to conduct electricity or electrical signals. For example, the electrical interconnect 108 may be a metal wire or ribbon. In some examples, multiple interconnects 108 (e.g., conductors) may be situated through (e.g., sealed in) the supply joint 106.

In some examples, the electrical interconnect 108 may be covered by a protective layer or layers. A protective layer is a layer of material that protects an electrical interconnect or interconnects. In some examples, the protective layer(s) may be polyimide (PI), polyethylene naphthalate (PEN), and/or polyethylene terephthalate (PET), etc. In some examples, the protective layer(s) may isolate and/or protect the electrical interconnect 108 from the print liquid. For example, an overmolded protective layer or layers may be utilized to house the electrical interconnect(s). For instance, an electrical interconnect 108 or electrical interconnects 108 may be embedded within (e.g., sandwiched between) protective layers. In some examples, the protective layer(s) may be transmissive. A transmissive protective layer(s) may allow welding (e.g., laser welding, ultrasonic welding, vibration welding) to be performed through the protective layer(s).

For example, a transmissive protective layer may allow the transmission of a welding laser beam through the protective layer(s). For instance, the supply joint 106 (e.g., welded joint) may be welded with a laser that passes through the protective layer that covers the electrical interconnect 108 (e.g., conductor). In some examples, the protective layer(s) may have a melting temperature that is greater than a melting temperature of material along the supply joint 106 (e.g., joint material). Using a protective layer(s) with a greater melting temperature may allow welding techniques to be performed while reducing or eliminating damage to the electrical interconnect 108. In some examples, the protective layer(s) may be compatible with the print liquid. For example, the protective layer(s) may not significantly degrade in the presence of print liquid and/or may not negatively impact the quality of the print liquid.

The electrical interconnect 108 may be sealed in the supply joint 106. For example, the seal may be a compression seal and/or a welded seal. The seal may be a waterproof seal (e.g., a seal to contain liquid such as print liquid). For example, the sealing may prevent the print liquid from leaking from the inside of the print liquid supply unit 100 to the outside of the print liquid supply unit 100, while allowing the electrical interconnect 108 (or electrical interconnects 108) to pass through the supply joint 106. In some examples, the seal may prevent air from leaking into the print liquid supply unit 100.

In some examples, the seal may be formed from the material(s) of the first housing component 102 and/or the second housing component 104. For example, the electrical interconnect 108 with the protective layer(s) may be sealed through the supply joint 106 without additional sealing material(s) such as additional plastic, rubber, elastomer, thermoplastic elastomer, adhesive (e.g., pressure sensitive adhesive), component(s), and/or gasket(s). In some examples, the protective layer(s) may not bond with the joint material (e.g., the first housing component 102 and/or the second housing component 104).

In some examples, the electrical interconnect 108 may be sealed in a passage region. A passage region is a portion of the supply joint 106 and/or joint geometry where the electrical interconnect 108 passes between the inside of the print liquid supply unit 100 and the outside of the print liquid supply unit 100. In some examples, the supply joint 106 may include a stepped structure in the passage region. The stepped structure is a geometrical structure that includes a step or ramp. In some examples, the supply joint 106 may not include a stepped structure in the passage region.

In some examples, the first housing component 102 and/or the second housing component 104 may include a flow structure or flow structures. A flow structure is a structure to control a flow of joint material (e.g., material in the supply joint 106) during welding. For example, a flow structure may direct the flow of joint material and/or may help to ensure that the joint material fills a potential gap or gaps. In some examples, the flow structure may include a protruding rib or ribs along edges of the supply joint 106. The protruding rib or ribs may maintain joint material in the supply joint 106 during welding. For example, the protruding ribs may form a lengthwise channel along the supply joint or along joint geometry. The channel may hold joint material (e.g., molten joint material) along the supply joint 106 during welding. In some examples, the protruding rib or ribs may compress during welding. An example of protruding ribs is given in connection with FIG. 4A.

In some examples, the joint geometry may include an extended structure or structures that extend the side(s) of the joint geometry in a passage region. For example, the extended structure(s) may provide additional joint material. The additional joint material may help to fill potential gaps in the passage region. An example of extended structures is given in connection with FIG. 4B.

In some examples, welding may be performed with a weld (e.g., ultrasonic weld, laser weld) that is not applied along a portion of the supply joint in a passage region. For instance, a protective layer may be non-transmissive and the weld may not be applied over the protective layer to avoid damaging the protective layer and/or electrical interconnect(s) 108.

Figure 2B:
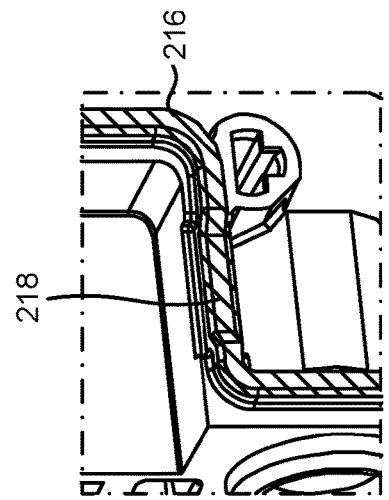
FIG. 2B illustrates an enlarged view of an example of a portion of the body.
Figure 2D:
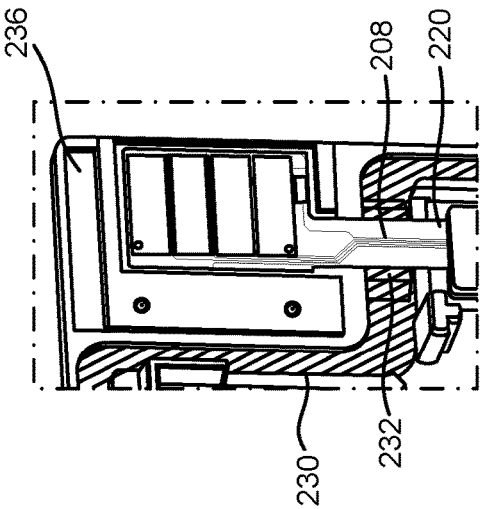
FIG. 2D illustrates an enlarged view of an example of a portion of the lid.
Figure 2A:
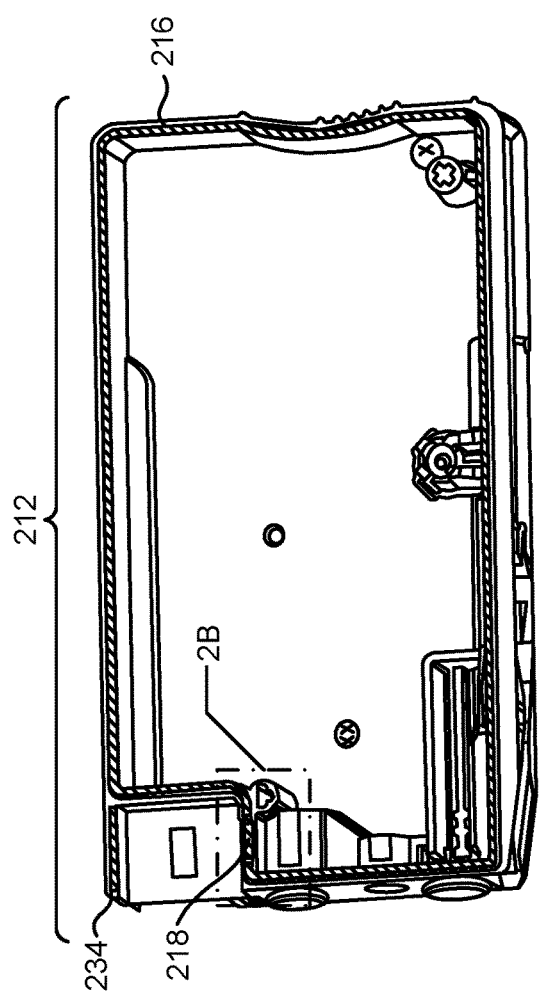
FIG. 2A is a diagram illustrating an example of a body.
Figure 2C:
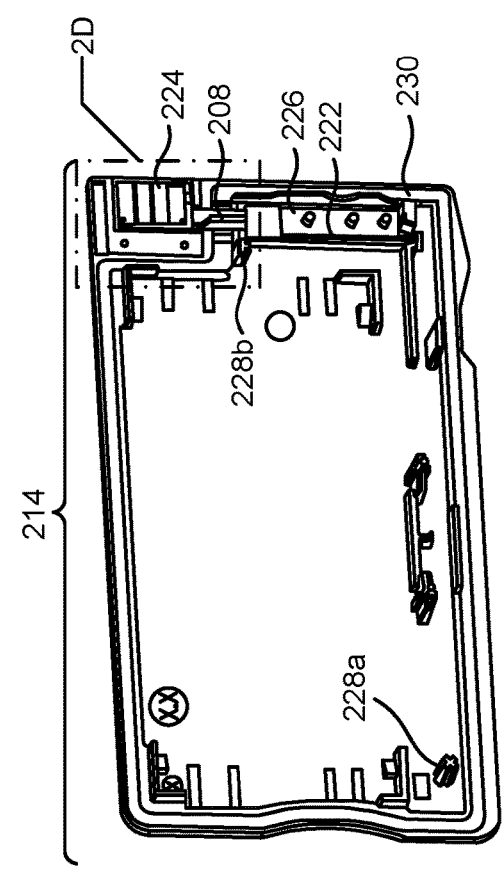
FIG. 2C illustrates an example of a lid.

FIG. 2A is a diagram illustrating an example of a body 212. FIG. 2B illustrates an enlarged view of an example of a portion of the body 212. FIG. 2C illustrates an example of a lid 214. FIG. 2D illustrates an enlarged view of an example of a portion of the lid 214. FIGS. 2A-D will be described together. The lid 214 may be an example of the first housing component described in connection with FIG. 1. The body 212 may be an example of the second housing component 104 described in connection with FIG. 1. For instance, the body 212 may be joined with the lid 214 to form a print liquid supply unit 100 (e.g., a print liquid container).

As illustrated, the body 212 includes body joint geometry 216. In some examples, joint geometry may be a kind of energy director that directs welding energy. For example, the body joint geometry 216 may direct laser welding energy to melt (e.g., partially or completely melt) the body joint geometry 216 in order to join the body 212 and the lid 214. It these examples, the body joint geometry 216 includes a raised rectangular structure with a chamfer on an edge or edges (e.g., on the exterior perimeter and/or interior perimeter). The body joint geometry 216 may provide joint material (e.g., a majority of plastic material) that melts in the supply joint to create a seal. The body joint geometry 216 may include a passage region 218. In these examples, body joint geometry 216 (e.g., supply joint) includes a stepped structure in the passage region 218. For example, the stepped structure is stepped inward with two angled sections (e.g., sections at 45-degree angles) and a flat section where electrical interconnects 208 pass through the supply joint. In some examples, the body 212 may include a separate welding section 234 corresponding to a counterpart recess 236 on the lid 214 for structural support.

A sensor assembly is illustrated with the lid 214. In this example, the sensor assembly includes electrical interconnects 208, protective layers 220, electrical pads 224, sensor(s) 222, and a sensor support 226. In some examples, the electrical interconnects 208 and protective layers 220 may form a flexible connector. In some approaches, the electrical interconnects 208 and the sensor support 226 are mounted to the lid 214 before welding the lid 214 and body 212. In some examples, press-fit posts 228*a-b* may be inserted into counterpart sockets to align the lid 214 to the body 212 before welding (e.g., laser welding). Other approaches and/or structures may be utilized to align the body 212 and lid 214. For example the two ends of the electrical interconnects 208 may be loose on both ends and alignment (and/or holding) of the body 212, lid 214, and electrical interconnects 208 may be accomplished with other procedures.

As illustrated in this example, lid joint geometry 230 includes a recessed track. The lid joint geometry 230 may be recessed to form a flash trap. The lid joint geometry 230 may include a raised structure 232 corresponding to the step structure of the body 212. The raised structure 232 may support the electrical interconnects 208 and the protective layers 220 (e.g., flexible connector) during welding. The electrical interconnects 208 and protective layers 220 may be sealed in the supply joint by performing welding.

In some examples, the body 212 and lid 214 may be container shells of a print liquid container. In some examples, the sensor 222 may be a container property sensor that includes a strain sensor or pressure sensor connector to a container wall. For example, the sensor support 226 and/or the sensor 222 may be connected to the container wall using posts (e.g., pressure-fit posts, posts that are swaged), adhesive, and/or another technique for attachment. A container wall is a barrier or partition of a container. The body 212 and/or lid 214 may include a container wall or container walls. In some examples, the electrical interconnect 208 may be a conductor that is coupled to the property sensor 222 and that is sealed through a welded joint of container shells. In some examples, the property sensor 222 may include a digital liquid level sensor.

Figure 3A:
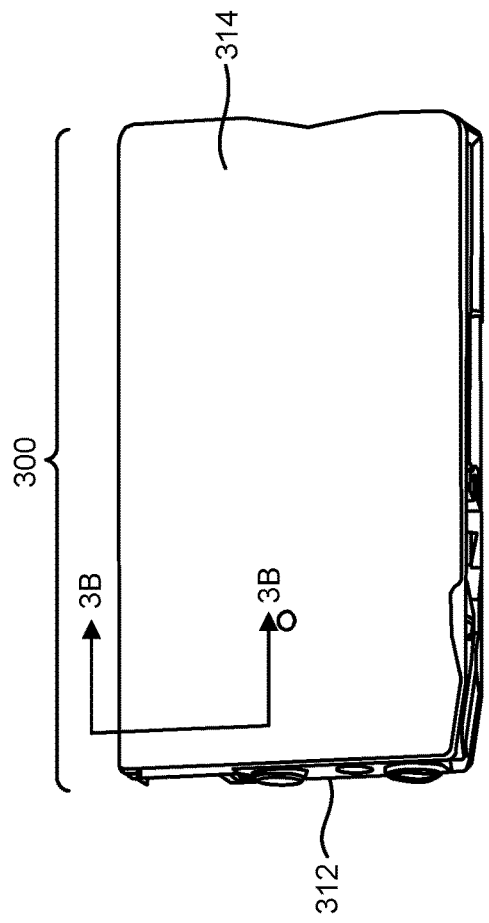
FIG. 3A is a diagram illustrating an example of a print liquid supply unit.
Figure 3C:
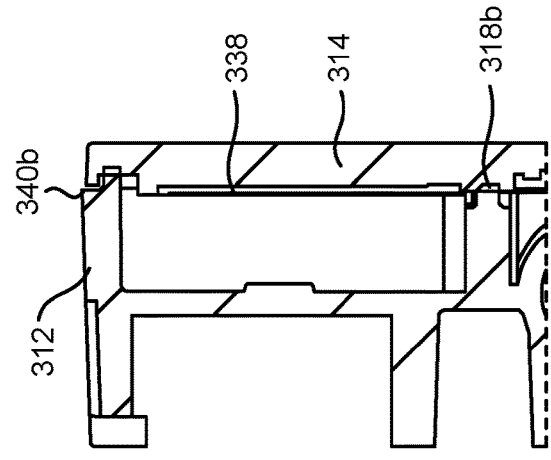
FIG. 3C illustrates an example of the cross section of the print liquid supply unit after welding.
Figure 3B:
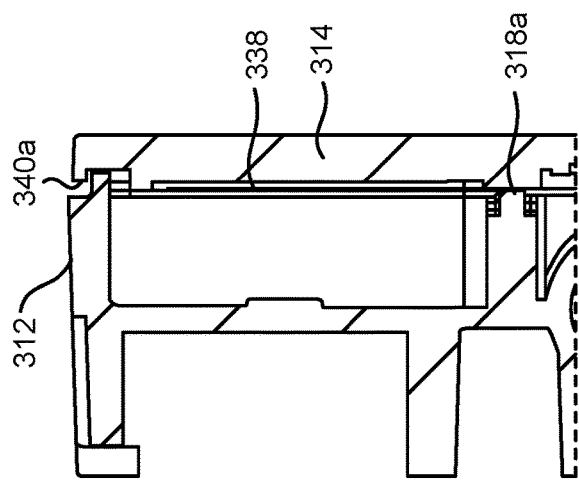
FIG. 3B illustrates an example of a cross section of the print liquid supply unit before welding.

FIG. 3A is a diagram illustrating an example of a print liquid supply unit 300. FIG. 3B illustrates an example of a cross section of the print liquid supply unit 300 before welding. FIG. 3C illustrates an example of the cross section of the print liquid supply unit 300 after welding. The print liquid supply unit 300 may be an example of the print liquid supply unit 100 described in connection with FIG. 1 or the print liquid supply unit described in connection with FIG. 2. The print liquid supply unit 300 includes a lid 314 and a body 312. The cross section illustrated in FIG. 3B is aligned with a middle of the passage region where an electrical connector 338 is located.

As described above, FIG. 3B illustrates a cross-section prior to welding. In FIG. 3B, the lid 314 is placed on the body 312. A gap 340a exists between the lid 314 and the body 312 to accommodate a collapse during welding. Before welding, the electrical connector 338 may be positioned through the passage region 318a.

As illustrated in FIG. 3C, the lid 314 is in a collapsed position after welding (e.g., the gap 340b between the body 312 and lid 314 is reduced). Joint material in the passage region 318b may melt to seal the supply joint. In some examples, the lid 314 may collapse in a 0.3-0.5 millimeter (mm) range during welding. In some examples, a welding laser (e.g., a near infrared (IR) laser) may have a nominal wavelength of 980 nanometers (nm) (e.g., in a 900-1080 nm range). In some examples, the lid 314 has a transmissivity in a 30-60% range and the body 312 may be doped such that the body 312 (e.g., joint geometry) absorbs a large proportion of laser energy (e.g., 80%, 90%, 100%, etc.). In some examples, the lid 314 may accordingly heat up when exposed to the welding laser, though a majority of the molten material used to form the weld may come from the body 312. For example, body joint geometry in the passage region 318b may melt to seal the electrical connector 338 in the supply joint. While some examples for collapse distance, laser wavelength, transmissivity rate, and absorption rate are given, other values may be utilized in other examples.

Figure 4A:
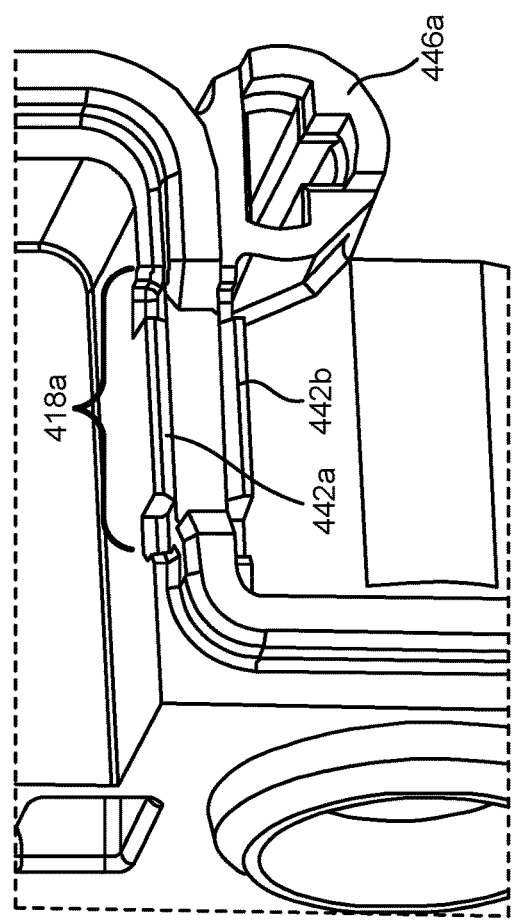
FIG. 4A is a diagram illustrating an enlarged view of an example of a passage region.

FIG. 4A is a diagram illustrating an enlarged view of an example of a passage region 418a. The passage region 418a may be implemented in some of the print liquid supply units described herein. For example, the passage region 418a may include a portion of body joint geometry where an electrical interconnect or interconnects (e.g., an electrical connector with a protective layer or layers) may be situated (e.g., sealed). FIG. 4A includes an example of a flow structure to control a flow of joint material during welding.

In this example, the flow structure includes protruding ribs 442a-b. In this example, the protruding ribs 442a-b are located along edges of the supply joint. In other examples, protruding ribs may be located differently (e.g., may be in-set from the edge(s) of the supply joint. The protruding ribs 442a-b may maintain joint material in the supply joint during welding. For example, the protruding ribs 442a-b have a wedge shape and are located above and below the energy director in the passage region 418a. The wedge shape may reduce the amount of energy absorbed by the protruding ribs 442a-b during welding. Wedges or other shapes may be utilized. In some examples, the protruding ribs 442a-b compress during welding. For example, the protruding ribs 442a-b may act as crush ribs to trap joint material (e.g., keep joint material in the supply joint) and conform around the electrical interconnect(s) (e.g., protective layer(s) and/or electrical connector). A flow structure (e.g., protruding ribs) may be beneficial to provide increased robustness for the seal in a passage region.

In some examples, supporting material 446a (e.g., an energy director) may be utilized near a corner or corners to strengthen the supply joint at a corner or corners. For example, the supporting material 446a may be located at a socket to add structural robustness to the inside corner of the weld. This may improve strength when the print liquid supply unit is pressurized. In some examples, the supporting material 446a may be utilized to add strength and/or may not be utilized for sealing.

Figure 4B:
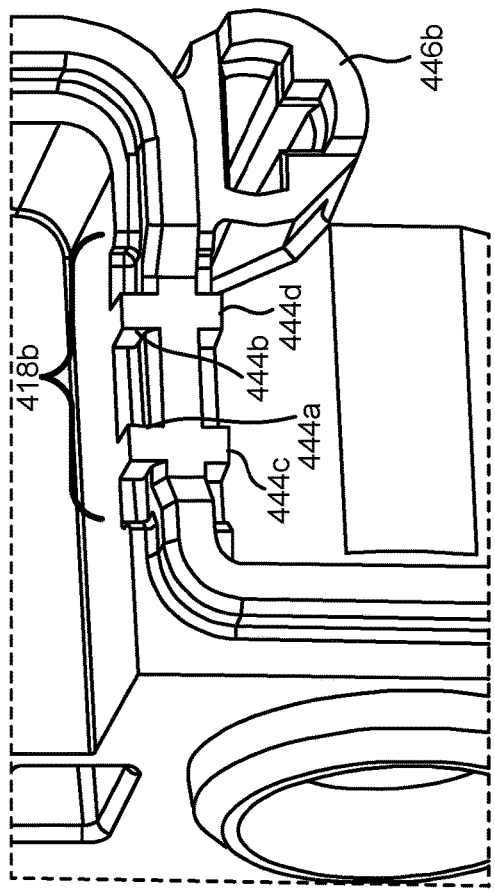
FIG. 4B is a diagram illustrating an enlarged view of an example of a passage region.

FIG. 4B is a diagram illustrating an enlarged view of an example of a passage region 418b. The passage region 418b may be implemented in the some of the print liquid supply units described herein. For example, the passage region 418b may include a portion of body joint geometry where an electrical interconnect or interconnects (e.g., an electrical connector with a protective layer or layers) may be situated (e.g., sealed). FIG. 4B includes an example of extended structures 444a-d that extend the sides of a joint geometry in a passage region 418b. In this example, the extended structures 444a-d form an "H" shape. Other shapes may be utilized in other examples.

In this example, the flow structure includes extended structures 444a-d. In this example, the extended structures 444a-d are rectangular energy directors to provide more joint material to form a seal along the edges of the electrical interconnect(s) (e.g., electrical connector). In some examples, extended structure(s) may provide more joint material in a width dimension of the joint geometry (in addition to along a length dimension of the joint geometry. For example, the extended structures may extend in a transverse direction across the joint geometry and/or weld path.

In some examples, supporting material 446b (e.g., an energy director) may be utilized near a corner or corners to strengthen the supply joint at a corner or corners. For example, the supporting material 446b may be located at a socket to add structural robustness to the inside corner of the weld.

FIG. 5A is a diagram illustrating a side view of an example of an electrical interconnect or electrical interconnects 508a and protective layers 520a. In some examples, the thickness of the protective layers 520a and the electrical interconnect(s) 508a may range between 0.05 millimeters (mm) and 1 mm. In some examples, a combination of electrical interconnect(s) and protective layer(s) may be referred to as an electrical connector. For instance, FIG. 5A illustrates an example of an electrical connector 548a that includes electrical interconnect(s) 508a and protective layers 520a. In some examples, the electrical connector 548a may include 1 to n number of electrical interconnects 508a sandwiched between protective layers 520a. In some examples, the electrical interconnect(s) 508a may be sandwiched between two protective layers 520a that are bonded or cast together to creating a seal between the protective layers 520a without adhesive.

In some examples, the protective layers 520a may be transmissive and welding (e.g., a welding laser) may pass over and/or through the electrical connector 548a (e.g., through the protective layers 520a). In some examples, the protective layer(s) may have a transmissivity in a range between 5% and 95%. The transmissivity may allow body joint geometry material behind the electrical connector 548a to melt. During welding, the transmissivity may allow the lid to heat up and the body material to melt and flow in multiple (e.g., five) directions around the electrical connector, making a compression seal around the flex protective material that is watertight. In some examples, the seal may be a compression seal because the plastic may conform around the electrical connector, but may not bond to the protective layer(s).

In some examples, materials used to encapsulate the electrical interconnect(s) 508a may have a melting temperature that is greater than a melting temperature of body and/or lid material to avoid damaging the materials. In some examples, the materials used to encapsulate may be robust enough to withstand liquid attack and may be inert to the print liquid. In some examples, the electrical connector 548a may be flexible.

FIG. 5B is a diagram illustrating a side view of an example of an electrical interconnect or electrical interconnects 508b and protective layers 520b. In some examples, the thickness of the protective layers 520b and the electrical interconnect(s) 508b may range between 0.05 mm and 1 mm. For instance, FIG. 5B illustrates an example of an electrical connector 548b that includes electrical interconnect(s) 508b and protective layers 520b. In some examples, the electrical connector 548b may include 1 to n number of electrical interconnects 508b sandwiched between protective layers 520b that are bonded and sealed together using adhesive 550. In some examples, the electrical connector 548b may be flexible. In some examples, the protective layers 520b and/or the adhesive 550 layers may be transmissive. In some examples, the protective layers 520b may not bond with joint material.

FIG. 5C is a diagram illustrating a front view of an example of flexible electrical connector 548c including electrical interconnects 508c and protective layers 520c. In the example of FIG. 5C, the electrical connector 548c is situated in a weld path 550c. The weld path 550c is a path along which welding is performed. For example, a weld path 550c may be located in a supply joint. In some examples, the electrical connector 548c may include 1 to n number of electrical interconnects 508c. Joint material in the weld path 550c may melt and flow in several directions (e.g., 5 directions) to create a compression joint around the protective layers 520c that creates a seal.

FIG. 5D is a diagram illustrating an example of an electrical connector 548b. The electrical connector 548d includes protective layers 520d, electrical interconnects 508d, and slots 552d. In the example illustrated in FIG. 5D, the electrical interconnects 508d are metal conductors included in a flexible electrical connector 548d. A slot is an opening in material. In some examples, sealing material may include a slot or slots. A slot may be located in sealing material or at an edge of sealing material. For example, the protective layers 520d illustrated in FIG. 5D includes four slots 552d. When welded, joint material may be situated in a slot. In some examples, a slot may be located between electrical interconnects. For example, the slots 552d may be created in the electrical connector 548d between electrical interconnects 508d. In the example of FIG. 5D, the electrical connector 548d is situated in a weld path 550d. During welding, the slots 552d may allow joint material to flow through the slots 552d to create a mechanically locked compression joint with improved robustness.

FIG. 5E is a diagram illustrating an example of an electrical connector 548e. The electrical connector 548e includes protective layers 520e, electrical interconnects 508e, and slots 552e. In the example illustrated in FIG. 5D, the electrical interconnects 508e are metal conductors included in a flexible electrical connector 548e. In the example shown in FIG. 5E, the slots 552e are at edges of the protective layers 520e. For example, the electrical interconnects 508e are in the middle of the electrical connector 548e. The slots 552e form a neck geometry that is narrower in the center of the weld path 550e. This neck geometry may beneficially reduce a distance across the electrical connector 548e for sealing. Other geometries that narrow within a weld path may be utilized. A slot located at an edge may be referred to as an edge feature. For example, the protective layers 520e illustrated in FIG. 5E includes two slots 552e. In the example of FIG. 5E, the electrical connector 548e is situated in a weld path 550e. During welding, the slots 552e on the outer edges may allow joint material to flow through the slots 552e to create a mechanically locked compression joint with improved robustness. In some examples, a combination of various geometries (e.g., squares, rectangles, triangles, trapezoids, circles, ovals, and/or combinations thereof) may be utilized.

While some examples of laser welding through a transmissive flexible electrical connection have been described herein, other implementations may be used in some examples. For example, other electrical interconnect seal embodiments that may not be transmissive may be sealed in the joint using ultrasonic or vibration welding.

Figure 6:
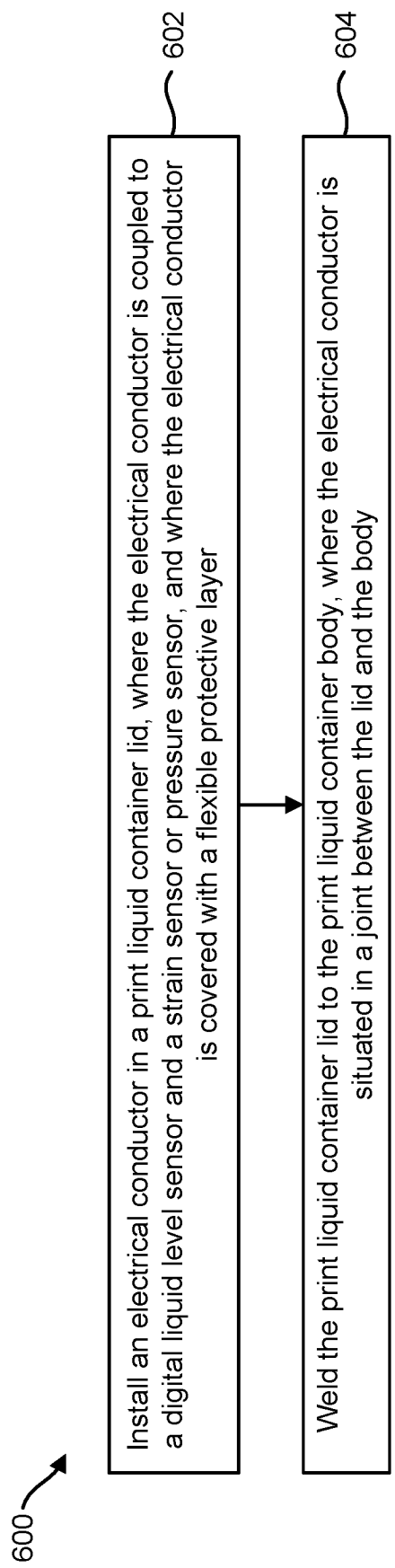
FIG. 6 is a flow diagram illustrating one example of a method for manufacturing a print liquid container.

FIG. 6 is a flow diagram illustrating one example of a method 600 for manufacturing a print liquid container. In some examples, the method 600 may be performed by an assembly machine or machines. The method 600 may include installing 602 an electrical conductor in a print liquid container lid. The electrical conductor may be coupled to a digital liquid level sensor and/or a strain sensor or pressure sensor. For example, the digital liquid level sensor and/or the strain sensor may be placed on a lid. In some examples, the digital liquid level sensor and/or strain sensor may be placed on a post or posts of the lid. In some approaches, the digital liquid level sensor may include an array of heaters and temperature sensors. Measurements from the digital liquid level sensor may but utilized to determine a print liquid level. For example, the digital print liquid level sensor may activate the array of heaters and measure the temperature at different levels. Lesser temperatures may correspond to heaters and temperature sensors that are below the print liquid level. Greater temperatures may correspond to heaters and temperature sensors that are above the print liquid level. The measured temperatures may indicate the level of the print liquid due to the different specific heats of print liquid and air.

In some examples, a strain sensor or a pressure sensor may be utilized to detect a condition (e.g., pressure and/or structural condition) in the print liquid container. For instance, the print liquid container may include a pressure chamber in some examples. The pressure chamber is a device that changes structure based on pressure. The pressure chamber may be expandable and collapsible. An example of a pressure chamber is a bag. In some examples, the pressure chamber may be utilized to regulate pressure (e.g., to avoid over-pressurization and/or under-pressurization due to altitude and/or temperature variations) inside of the print liquid container. In some examples, the pressure chamber may be expanded (e.g., inflated) in order to purge print liquid from a print head for servicing. In some examples, the strain sensor may be utilized to detect structural deflection of the print liquid container due to expansion of the pressure chamber. In some examples, the pressure sensor may be utilized to detect a pressure change in the print liquid container due to the expansion of the pressure chamber. In some examples, the electrical conductor is covered with a flexible protective layer.

The method 600 may also include welding 604 the print liquid container lid to a print liquid container body. The electrical conductor may be situated in a joint between the print liquid container lid and the print liquid container body. In some examples, the print liquid container lid and the print liquid container body include a thermoplastic material.

Some examples of the techniques described herein may be beneficial. For example, some of the approaches and/or structures for passing a conductor or connector through a joint or through a container wall may be compatible with mass production approaches. In some examples, laser welding may be utilized, which may be cost effective, space efficient, and/or may not utilize additional joint materials. Additional joint materials may take more space, raise compatibility issues, increase manufacturing costs, and/or may take additional curing time.

FIG. 7 shows an example print liquid supply cartridge 700. In some examples, the print liquid supply cartridge 700 may be an example of the print liquid supply unit 100 described in connection with FIG. 1, an example of the print liquid container described herein, and/or an example of the print liquid container described in connection with FIG. 6. In some examples, the print liquid supply unit housing components 102, 104 may be implemented with the print liquid supply cartridge 700. More particularly, FIG. 7 shows an elevation view of the example cartridge 700. The cartridge 700 has a housing 780 which encloses an internal volume in which the print liquid, such as ink or agent, can be stored. The internal volume of the example cartridges described herein may be between approximately 10 milliliters to approximately 50 or approximately 100 milliliters. The housing 780 has a front end 781, a rear end 782 and first and second sides 783, 784 extending from the front end to the rear end. The front end 781 and the rear end 782 can be seen also in FIG. 8, which is a cross-sectional view through the line C-C of the example print liquid supply cartridge of FIG. 7. The housing 780 may comprise two relatively hard plastic shells which directly contain the print liquid therebetween. In the example, the height of the housing is greater than the width of the housing. Similarly, the height of the internal volume is greater than the width of the internal volume. The height of the internal volume may be defined by the height of the first and second sides and the width of the internal volume may be defined by the distance between the first and second sides.

The front end 781 may have a print liquid outlet 785 through which the print liquid can be supplied to a printer, for example by insertion of a fluid pen of the printer therein. The print liquid outlet 785 may be provided closer to the bottom than to the top of the front end 781.

A gas inlet 786 may be provided on the front end 781 also, to enable gas such as air to be supplied to the cartridge, for example, by insertion of a fluid pen of the printer therein. The gas inlet 786 may be positioned above the print liquid outlet 785.

A first wall 788 having an internal side 789 and an external side 790 may be provided to delimit a recess 791. In the example shown, the recess 791 extends from the first wall 788 across the entire width of the front end 781. The first wall 788 thus overhangs a notched corner of the housing. The external side 790 of the first wall 788 may be part of the first side 783 of the housing 780. Electrical connection pads 792 are exposed on the internal side of the first wall, as shown also in FIG. 8. The electrical connection pads 792 are indicated by a single block in FIGS. 7 and 8. In one example, there are three electrical connection pads, although fewer or more connection pads may be provided. The electrical connection pads may be arranged in a top to bottom direction. The electrical connection pads enable electrical signals to be communicated between electrical circuitry of the cartridge and electrical circuitry of the printer, for example in accordance with an inter-integrated circuit (I2C) data communication protocol. Hence, the connection pads may form an I2C data interface. Providing the electrical connection pads 792 to the first wall 788 allows for easy mounting of the electrical connection pads 792 on the cartridge. Being positioned on the internal side 789, the electrical connection pads 792 are protected from damage when shipping and handling the cartridge. The recess 791 can receive an electrical connector of a printer to establish an electrical connection between the electrical connection pads 792 and the electrical connector.

Figure 9:
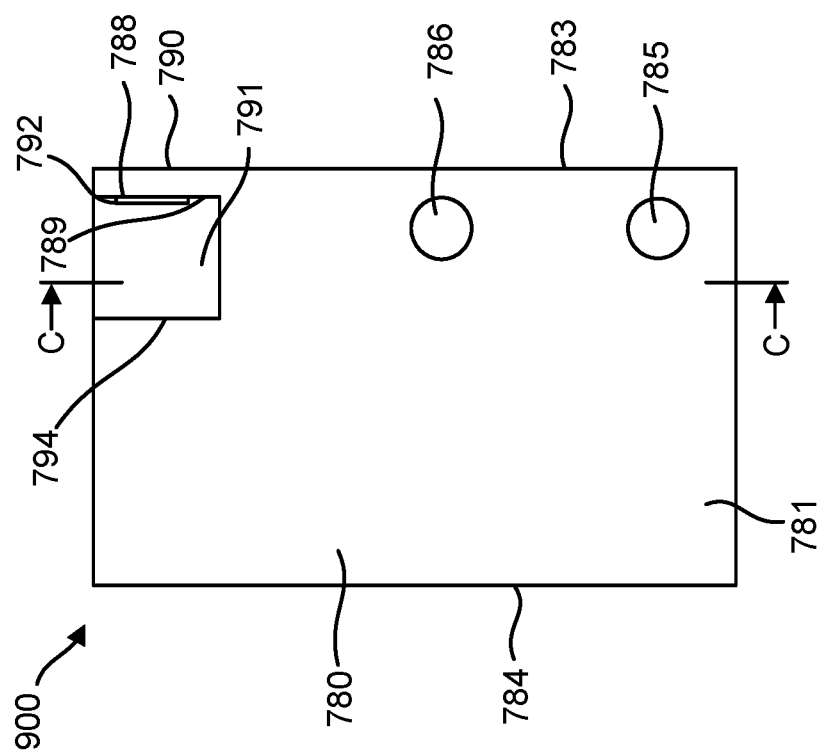
FIG. 9 shows another example print liquid supply cartridge.

FIG. 9 shows another example print liquid supply cartridge 900. In particular, FIG. 9 shows an elevation view of the cartridge 900. The example cartridge of FIG. 9 is similar to that of FIG. 7. In the example of FIG. 9, the recess 791 does not extend across the entire width of the front end 781. The recess 791 is delimited by a second wall 794. The recess 791 between the first wall 788 and the second wall 794 may receive an electrical connector of a printer therein to contact the electrical connection pads 792.

Figures 10A, 10B:
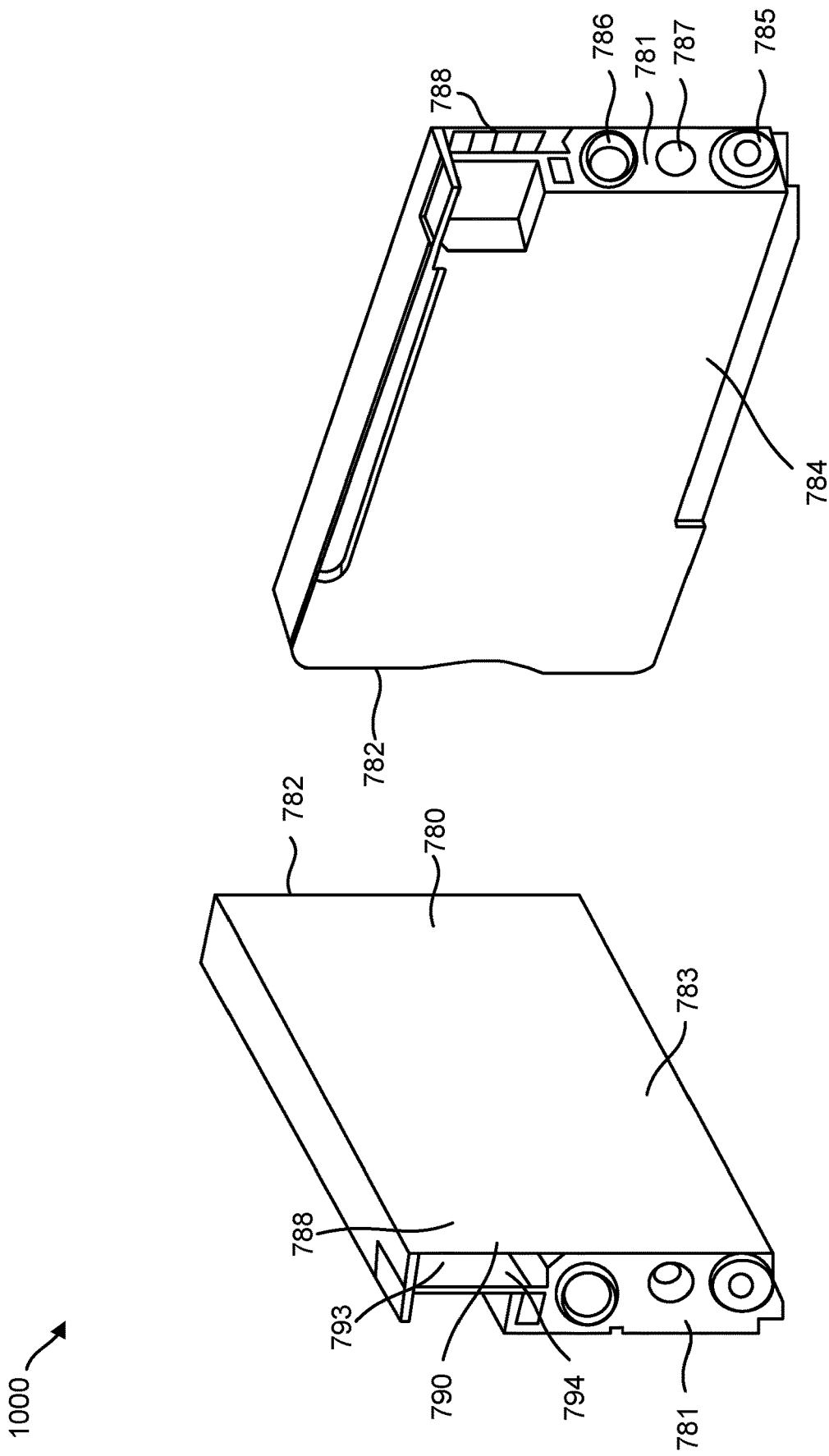
FIGS. 10A and 10B are perspective views of another example print liquid supply cartridge.
Figure 11:
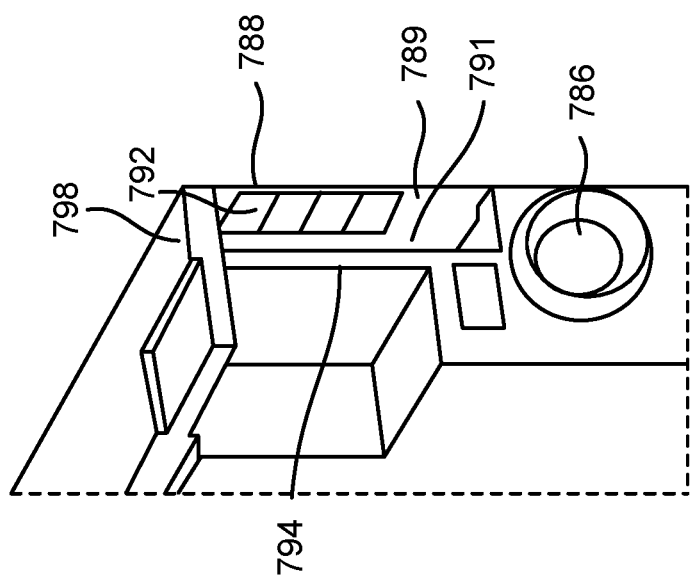
FIG. 11 is a magnified view of part of the example cartridge.

FIGS. 10A and 10B are perspective views of another example print liquid supply cartridge 1000. FIG. 11 is a magnified view of part of the example cartridge 1000. The same reference numerals are used for like parts. The cartridge 1000 has a housing 780 which encloses an internal volume in which the print liquid, such as ink or agent, can be stored. The housing 780 has a front end 781, a rear end 782, and first and second sides 783, 784 extending from the front end to the rear end. A print liquid outlet 785 and a gas inlet 786 may be provided on the front end. The print liquid outlet 785 may be provided closer to the bottom than to the top of the front end 781. The gas inlet 786 may be positioned above the print liquid outlet 785. The front end may also have a print liquid inlet 787 to enable the cartridge to be filled or re-filled with print liquid.

In the example of FIGS. 10A, 10B and 11, there may be provided a datum surface 793 across the recess from the internal side 789 of the first wall 788. A rib 798 may support the first wall 788. In the example shown, the datum surface is a side of a second wall 794 facing towards the recess 791. The datum surface 793 helps ensure smooth installation and removal of the print liquid supply cartridge to and from a printer.

In some examples, the print liquid supply cartridge 1000 may include a conductor or conductors that are situated through a joint of the print liquid supply cartridge 1000. For example, a first conductor may be a serial data line and/or a second conductor may be a clock line. In some examples, a third conductor may be a power line and/or a fourth conductor may be a ground line. In some examples, the conductor or conductors may be coupled to the electrical connection pad or pads 792. The electrical connection pad(s) 792 may be situated in the recess 791.

In some examples, the electrical connection pad(s) 792 and the conductor(s) may be supported by a housing component. For example, the electrical connection pad(s) and the conductor(s) may be supported by the first housing component 102 (e.g., lid) described herein. For instance, the electrical connection pad(s) and the conductor(s) may be supported by the first wall 788, which may be a first wall 788 of a first housing component. In some examples, the print liquid supply cartridge 1000 includes a sensor or sensors. In some examples, the sensor(s) may be supported by the first housing component and/or the first wall 788.

In some examples, the print liquid supply cartridge 1000 may include a print liquid interface or interfaces. A print liquid interface is an interface for the passage of print liquid. Examples of a print liquid interface may include the print liquid outlet 785 and the print liquid inlet 787, which may be included in the front end 781 of the print liquid supply cartridge.

The invention claimed is:

1. A print liquid supply unit, comprising:
   an electrical interconnect sealed in a supply joint and extending through the supply joint from an outside of the supply unit to an inside of the supply unit, wherein the supply joint is welded to join housing components of the supply unit.

2. The print liquid supply unit of claim 1, wherein the electrical interconnect comprises a first conductor and a second conductor, wherein the first conductor is a serial data line and the second conductor is a clock line.

3. The print liquid supply unit of claim 2, wherein the electrical interconnect comprises a third conductor and a fourth conductor, wherein the third conductor is a power line and the fourth conductor is a ground line.

4. The print liquid supply unit of claim 1, wherein the supply joint comprises a stepped structure in a passage region.

5. The print liquid supply unit of claim 1, further comprising a flow structure to control a flow of joint material during welding.

6. The print liquid supply unit of claim 5, wherein the flow structure comprises protruding ribs along edges of the supply joint, wherein the protruding ribs maintain joint material in the supply joint during welding.

7. The print liquid supply unit of claim 6, wherein the protruding ribs compress during welding.

8. The print liquid supply unit of claim 1, wherein a joint geometry comprises extended structures that extend sides of the joint geometry in a passage region.

9. The print liquid supply unit of claim 1, wherein the electrical interconnect is covered by a protective layer.

10. The print liquid supply unit of claim 9, wherein the protective layer comprises a slot.

11. The print liquid supply unit of claim 10, wherein joint material is situated in the slot.

12. The print liquid supply unit of claim 10, wherein the slot is situated in a weld path of the supply joint.

13. The print liquid supply unit of claim 10, wherein the slot is located in the protective layer between the electrical interconnect and a second electrical interconnect.

14. The print liquid supply unit of claim 10, wherein the slot is located at an edge of the protective layer.

15. The print liquid supply unit of claim 1, further comprising a front end with at least one print liquid interface, a bottom, and a top, wherein the print liquid supply unit comprises a recess in and between the front end and the top, wherein an electrical connection pad is situated in the recess.

16. The print liquid supply unit of claim 15, wherein the electrical connection pad and the electrical interconnect are supported by a first housing component.

17. The print liquid supply unit of claim 16, wherein the electrical connection pad and the electrical interconnect are supported by a same wall of the first housing component.

18. The print liquid supply unit of claim 16, comprising at least one sensor connected to the electrical interconnect, wherein the at least one sensor is supported by the same wall or the first housing component.

19. The print liquid supply unit of claim 1, further comprising a print liquid outlet and a gas inlet of the print liquid supply unit.

20. A print liquid container, comprising:
   a container property sensor including a strain sensor or pressure sensor connected to a container wall; and
   a conductor coupled to the container property sensor that is sealed through a welded joint of container shells.

21. The print liquid container of claim 20, wherein the container property sensor includes a digital liquid level sensor.

22. The print liquid container of claim 20, wherein the welded joint is welded with a laser that passes through a protective layer that covers the conductor.

23. The print liquid container of claim 22, wherein the protective layer has a first melting temperature that is greater than a second melting temperature of joint material.

24. A method, comprising:
   installing an electrical conductor in a print liquid container lid, wherein the electrical conductor is coupled to a digital liquid level sensor and a strain sensor or pressure sensor, and wherein the electrical conductor is covered with a flexible protective layer; and
   welding the print liquid container lid to a print liquid container body, wherein the electrical conductor is situated in a joint between the print liquid container lid and the print liquid container body.

25. The method of claim 24, wherein the print liquid container lid and the print liquid container body comprise a thermoplastic material.

* * * * *